United States Patent [19]

Hirosawa et al.

[11] Patent Number: 4,812,967
[45] Date of Patent: Mar. 14, 1989

[54] METHOD AND APPARATUS FOR CONTROLLING INTERRUPTS IN A VIRTUAL MACHINE SYSTEM

[75] Inventors: Toshio Hirosawa, Machida; Jun'ichi Kurihara, Hachioji; Shigemi Okumura, Kiyose, all of Japan

[73] Assignee: Hitachi, Ltd., Tokyo, Japan

[21] Appl. No.: 837,345

[22] Filed: Mar. 7, 1986

[30] Foreign Application Priority Data

Mar. 11, 1985 [JP] Japan ................................. 60-46676

[51] Int. Cl.⁴ .................... G06F 12/08; G06F 13/00
[52] U.S. Cl. ................................................. 364/200
[58] Field of Search ........................ 364/200 MS File

[56] References Cited

U.S. PATENT DOCUMENTS

| 4,253,145 | 2/1981 | Goldberg | 364/200 |
| 4,400,769 | 8/1983 | Kaneda et al. | 364/200 |
| 4,456,954 | 6/1984 | Bullions, III et al. | 364/200 |
| 4,459,661 | 7/1984 | Kaneda et al. | 364/200 |
| 4,564,903 | 1/1986 | Guyette et al. | 364/200 |

Primary Examiner—Gareth D. Shaw
Assistant Examiner—Adolfo Ruiz
Attorney, Agent, or Firm—Antonelli, Terry & Wands

[57] ABSTRACT

At an occurrence of an interrupt, each entry of the vector table of the vitrual machine monitor to be referenced by the hardware of the bare machine is loaded with an address of an interrupt processing program of the running virtual machine for an interrupt number associated with the entry. When the interrupt is allowed to be directly processed by the virtual machine, the virtual machine monitor is not activated, that is, the interrupt processing program of the vitual machine can immediately execute the necessary processing, which eliminates the overhead associated with the intervention of the virtual machine monitor. Moreover, the content of the system stack pointer is set to point to the stack of the running virtual machine. Consequently, the content of the registers to be saved for an interrupt processing are directly stored in the stack of the running virtual machine, and therefore the overhead caused because the stack of the virtual machine monitor is used is removed.

6 Claims, 7 Drawing Sheets

METHOD AND APPARATUS FOR CONTROLLING INTERRUPTS IN A VIRTUAL MACHINE SYSTEM

BACKGROUND OF THE INVENTION

The present invention relates to a virtual machine system, and in particular, to a method for controlling interrupts in a virtual machine system and a virtual machine system implementing the interrupt control.

As conceptually shown in FIG. 1, conventional virtual machine system enables a plurality of operating systems (to be abbreviated as OS hereinbelow) 506, 507 to be executed in a bare machine 501 apparently at the same time. To this end, there is not provided a direct base machine interface between each OS 506, 507 and the bare machine 501 but a special control program (for example, a virtual machine monitor) 502 is prepared and operates in the bare machine 501 under control of a base machine interface 503 to support for each OS 506, 507 a base machine interface 508 equivalent to the base machine interface 503. A machine conceptually formed when the virtual machine monitor 502 establishes the base machine interface is referred to as a virtual machine. Although FIG. 1 includes two virtual machines 504, 505 in which the operating systems 506, 507 function, respectively, an arbitrary number of virtual machines can be configured. The virtual machines 504, 505 are changed over under control of the virtual machine monitor 502 so that they operate virtually at the same time.

On the other hand, the operating systems 506, 507 support extended machine interfaces 513, 514 for user programs 515, 516 and 517, 518, respectively, thereby forming extended machines 509-512. Each extended machine 509-512 has a function to execute in the respective OS a processing in response to a processing request, for example, a supervisor call or a function call issued for a set of functions from a user program associated with the extended machine and a base machine interface function supported by the extended machine interface. Consequently, if the operating systems 506, 507 are different from each other, the extended machines (for example, 509 and 511) belonging thereto, respectively have different functions.

As described above, the virtual machine system enables a plurality of operating systems to be executed in a single bare machine virtually at the same time, which expectedly leads to the following effect.

(1) Service of a running system need not be stopped to conduct a debug or a test for a new system being developed.

(2) Since a plurality of different OS's can operate in a single bare machine, the effectiveness of hardware resource utilization is improved.

(3) A bare machine enables to virtual configuration of a machine system having a different architecture or system configuration, and hence a control program of a new machine or system can be tested even when the pertinent hardware does not exist.

For implementation of the virtual machine system, there is supported the special control program, virtual machine monitor 502. To effectively operate the virtual machines 504, 505, the virtual machine monitor 502 divides the hardware resources of the bare machine 501 with respect to time and space by use of multiprogramming technology, thereby allocating the hardware resources to each virtual machine 504, 505. Instructions for manipulating hardware resources are defined as privileged instructions to guarantee integrity of the overall virtual machine system and are allowed to be executed only in an operation mode called a privileged mode. On detecting such a privileged instruction issued from the OS 506 or 507, the virtual machine monitor 502 interprets and executes the instruction. When the execution is finished, it returns control to an OS currently running. This processing is necessary to share the resources of the bare machine 501 among the virtual machines, and the period of time required for the processing becomes an overhead time unique to the virtual machine system. In addition, since a shared main memory is realized by use of techniques associated with the virtual storage system, the period of time used to convert addresses for the virtual storage is also included in the overhead time. The overhead unique to the virtual machine system can be briefly classified as follows.

(1) Overhead due to a simulation processing of a privileged instruction (2) Overhead caused by a simulation processing of an interrupt (3) Overhead due to an address conversion to support the virtual storage function (4) Overhead associated with a dispatch processing (changeover service) between virtual machines Conventionally, the virtual machine system has been considered for use primarily in a field of large-sized general-purpose computers, namely, main frame processors. According to remarkable progress in LSI technology microcomputer technology has greatly advanced; as a result, combinations of microcomputers and peripheral devices, namely, so-called personal computers have been put to practical use. Many application programs for various personal computers are under development at present. In this situation, useful application programs developed for a personal computer are desired to be used in another personal computer. However, such application programs have been created to operate under the respective OS. For personal computers, application programs are especially linked to operating systems. We foresee that such application programs will be desired to be executed in another personal computer having different OS, and that it will be necessary to replace the OS in general to recreate portions of application programs which are closely related to the OS. This is quite inconvenient. Consequently, it will be considerably effective to adopt as a measure for solving this problem the virtual machine system enabling a plurality of operation systems to operate in a single bare machine, for example, because the size of an OS of a personal computer is quite smaller than that of an of a large-sized machine.

At present, however, such a computer is not provided with means to reduce the overhead caused by the virtual machine monitor as described above. Improvement to minimize the overhead to the maximum extent is desired when applying the virtual machine system to a personal computer.

A typical microprocessor architecture in use at present has been described, for example, in "A Microprocessor Architecture for a Changing World: The Motorola 68000" Computer, Vol. 12, pp. 43-51 (1979-2), IEEE and "iAPX 86 Family User's Manual", Intel Corporation: Document No. 205885.

SUMMARY OF THE INVENTION

It is therefore an object of the present invention to provide a control method and apparatus in a virtual machine system implemented in a considerably small-sized computer system such as a personal computer including microprocessors, the method and apparatus responsive to an occurrence of an exceptional (or interrupt) condition, for example, a zero division exception in a user program executed under control of an operating system associated with a virtual machine for reducing a processing overhead to be caused by an intervention of a virtual machine monitor.

The present invention aims at minimizing the intervention of the virtual machine to the possible extent in the interrupt processing so as to directly initiate an interrupt processing program of the virtual machine.

The following paragraphs describes first of all a processing to be achieved when a program interrupt such as a zero division exception takes place in a virtual machine system implemented with a personal computer comprising a microprocessor, and the control method of the present invention will be outlined. When a virtual machine system is configured with a personal computer, the virtual machines 504, 505 each include a vector table. On the other hand, the bare machine 501 comprising a microprocessor includes a real vector table.

In a process in which the user program 515 is being executed under control of the OS 506 corresponding to a virtual machine, if an interrupt is requested and the request satisfies the interrupt condition, an execution of the subsequent instructions of the user program 515 is interrupted and a microprogram in the hardware of the bare machine 501 starts operation of the interrupt processing. The contents and sequence of this operation are briefly summarized as follows.

(1) Saves the microprocessor status into work registers.

(2) Calculates an entry position (an entry address of a vector table) for an interrupt number (interrupt identification number) in the real vector table of the virtual machine monitor 502.

(3) Stores in a stack area of the virtual machine monitor 502 the contents of a program counter (instruction address register) and various operation registers and the status saved by step (1) above.

(4) Reads an address of the new instruction based on the vector address obtained in the step (2) and sets the address to the program counter.

The processing described above is carried out by microprograms in a microprogram processing section 501A of FIG. 2. When the step (4) is executed, control is transferred to the virtual machine monitor 502.

FIG. 2 is a schematic diagram briefly illustrating the operation of interrupt processing in accordance with the present invention. For comparison, an operation of interrupt processing according to a control method which is taught by the present inventors is indicated by dotted lines, whereas an operation to which the control method of the present invention is applied is represented by solid lines. Referring now to FIG. 2, each entry location of a vector table 550 in the virtual machine monitor 502 keeps the first address of a program to process an interrupt assigned with an interrupt number associated with the program. For example, entry 551 corresponds to a privileged instruction exception and keeps the first address of a program 552 for simulating a privileged instruction. Entry 553 corresponds to a zero division exception and thus keeps the first address of an interrupt operation initiate processing program 554. In addition, vector table entries and processing programs associated with the instruction exception, input/output interrupt, and timer interrupt are prepared in the virtual machine monitor 502.

When the control system of the present invention is not applied, the address of the interrupt operation initiate processing 554 for interrupting the OS 506 of the pertinent virtual machine in the virtual machine monitor is set to the zero division exception entry 553 in the real vector table 550, and thus the processing program 554 is executed when required.

The interrupt operation initiate processing program 554 performs a processing equivalent to the operation of the microprogram section 501A of the microprocessor by use of a vector table 555 and a stack 201 of the virtual machine, and this processing becomes to be an overhead of the virtual machine monitor.

In contrast, according to the present invention, each entry of the vector table of the virtual machine monitor to be referenced by the bare machine hardware at an occurrence of an interrupt is beforehand loaded with the address of an interrupt processing program of a virtual machine to be used for an interrupt number associated with the entry. Naturally, an interrupt such as a timer interrupt for which the virtual machine monitor must directly achieve the processing is not included. If an interrupt thus occurred is allowed to be directly processed by the virtual machine, the virtual machine monitor is not activated, that is, the interrupt processing program of the virtual machine can immediately effect the necessary processing, which eliminates the overhead associated with the intervention of the virtual machine monitor.

Moreover, the content of the system stack pointer indicating the stack is also beforehand set to indicate the stack of the virtual machine currently running. Consequently, the contents of the registers to be saved for an interrupt processing are directly stored in the stack of the running virtual machine, and hence the overhead caused because the stack of the virtual machine monitor is used is removed.

According to the present invention, when the virtual machine monitor achieves the dispatch processing for allocating resources of the bare machine of FIG. 1 to the virtual machines, it changes the value of the entry 553 of the vector table 550 and the system stack pointer value as will be described later; and hence the contents of the program counter and various operation registers and the status of the processor are directly saved into the stack 201 of the OS 506 in the virtual machine, not into a stack 558 of the virtual machine monitor 502 in the operation (3) of the microprogram processing section 501A in the bare machine. Since the address of the stack 558 is ordinarily indicated by the system stack pointer, the direct save processing is implemented by replacing the system stack pointer content with the address of the stack 201 in the dispatch processing.

Furthermore, in the operation (4) of the microprogram processing section 501A, the first address of an interrupt processing program 557 of the OS 506 in the virtual machine is directly set to the program counter. This operation is achieved in the dispatch processing by replacing the content of the corresponding entry 553 of the vector table 550 in the virtual machine monitor with the first address of the interrupt processing program 557 of the OS 506 in the virtual machine.

Consequently, the interrupt operation initiate processing program (for example 554) enclosed with dotted lines in the virtual machine monitor 502 can be dispensed with. As a result, the period of time required for an execution of 500 to 600 instructions to initiate the processing, that is, the overhead of the virtual machine monitor can be removed.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

Figure 1:
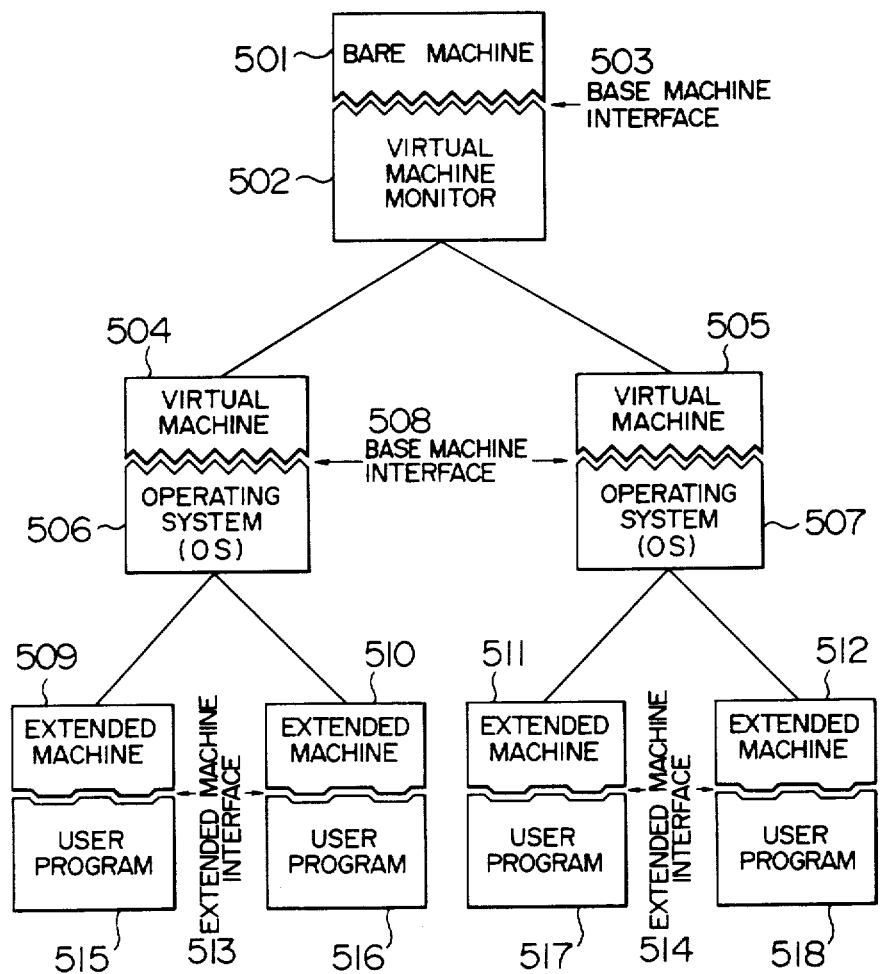
FIG. 1 is a conceptional diagram illustrating a conventional virtual machine system.
Figure 2:
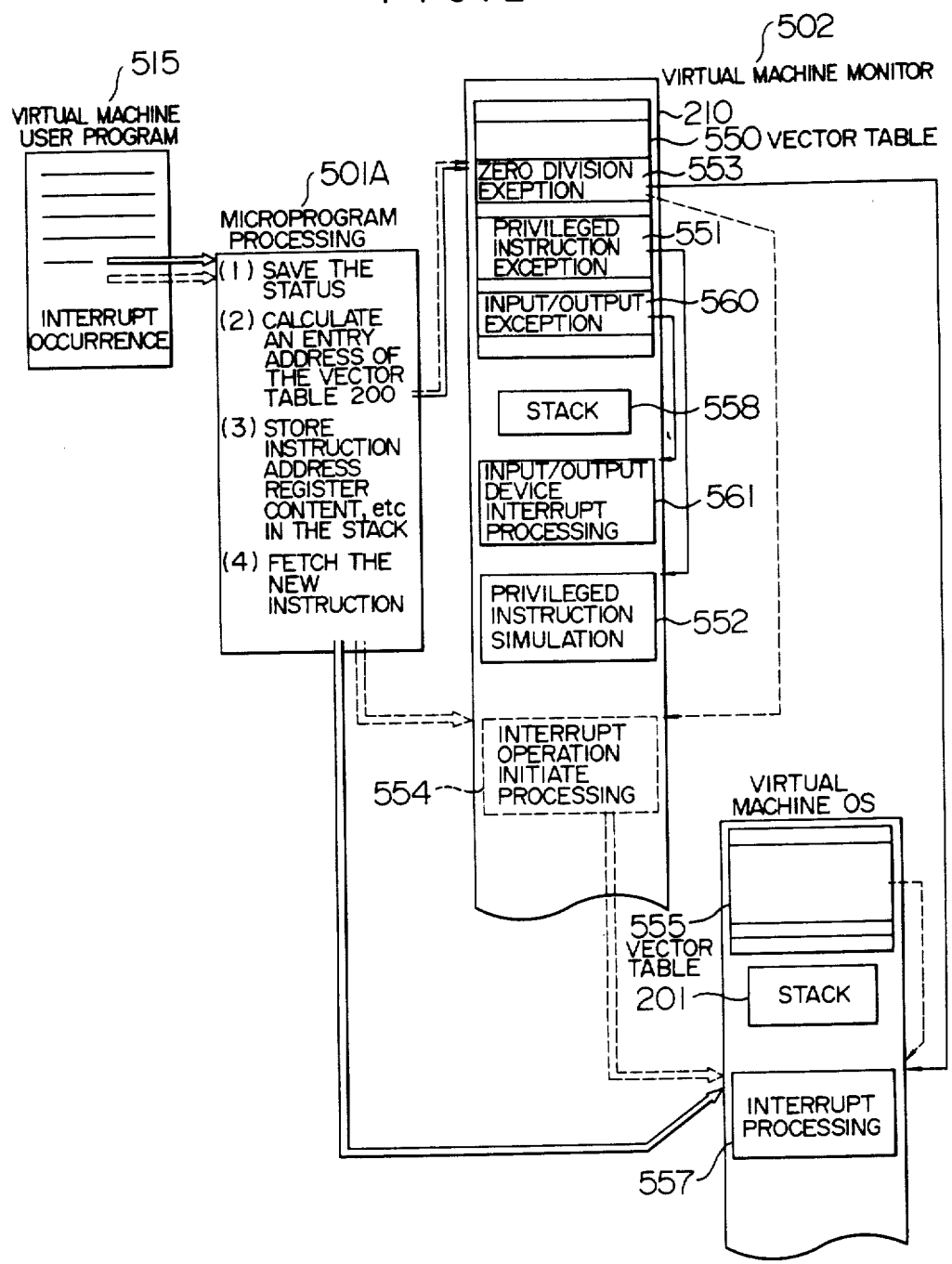
FIG. 2 is a schematic diagram depicting an instantiation of an interrupt processing procedure according to the present invention.
Figure 3:
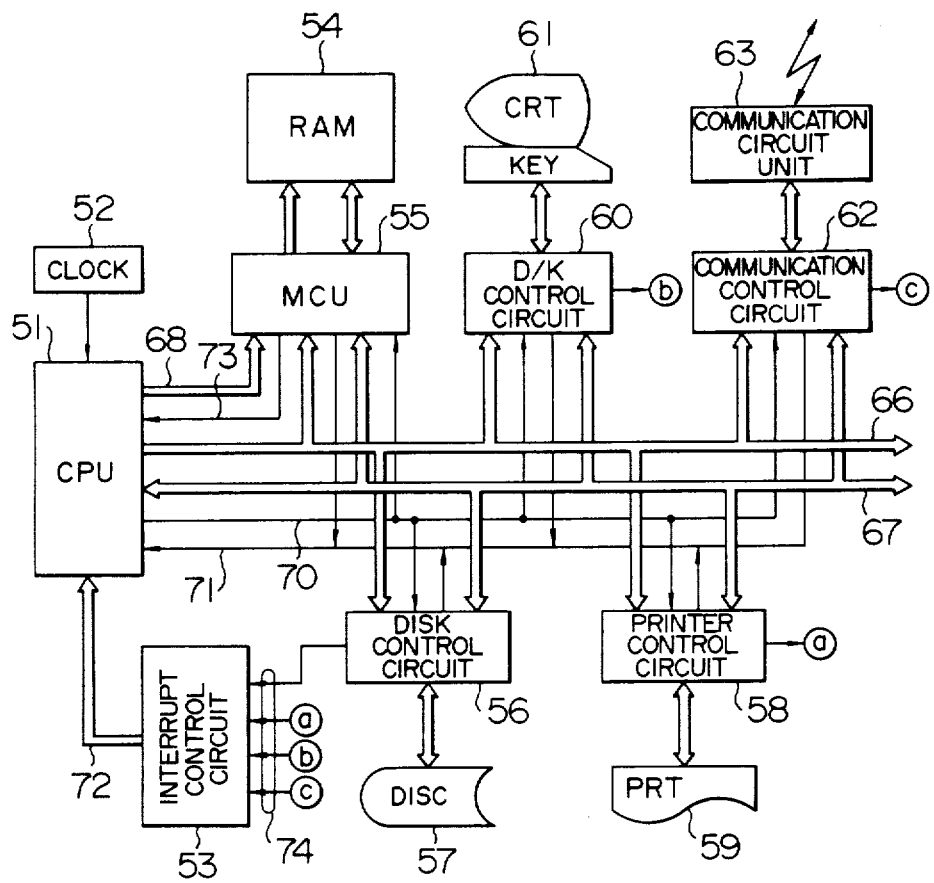
FIG. 3 is a block diagram showing an example of a personal computer to which the present invention is applied.
Figure 4:
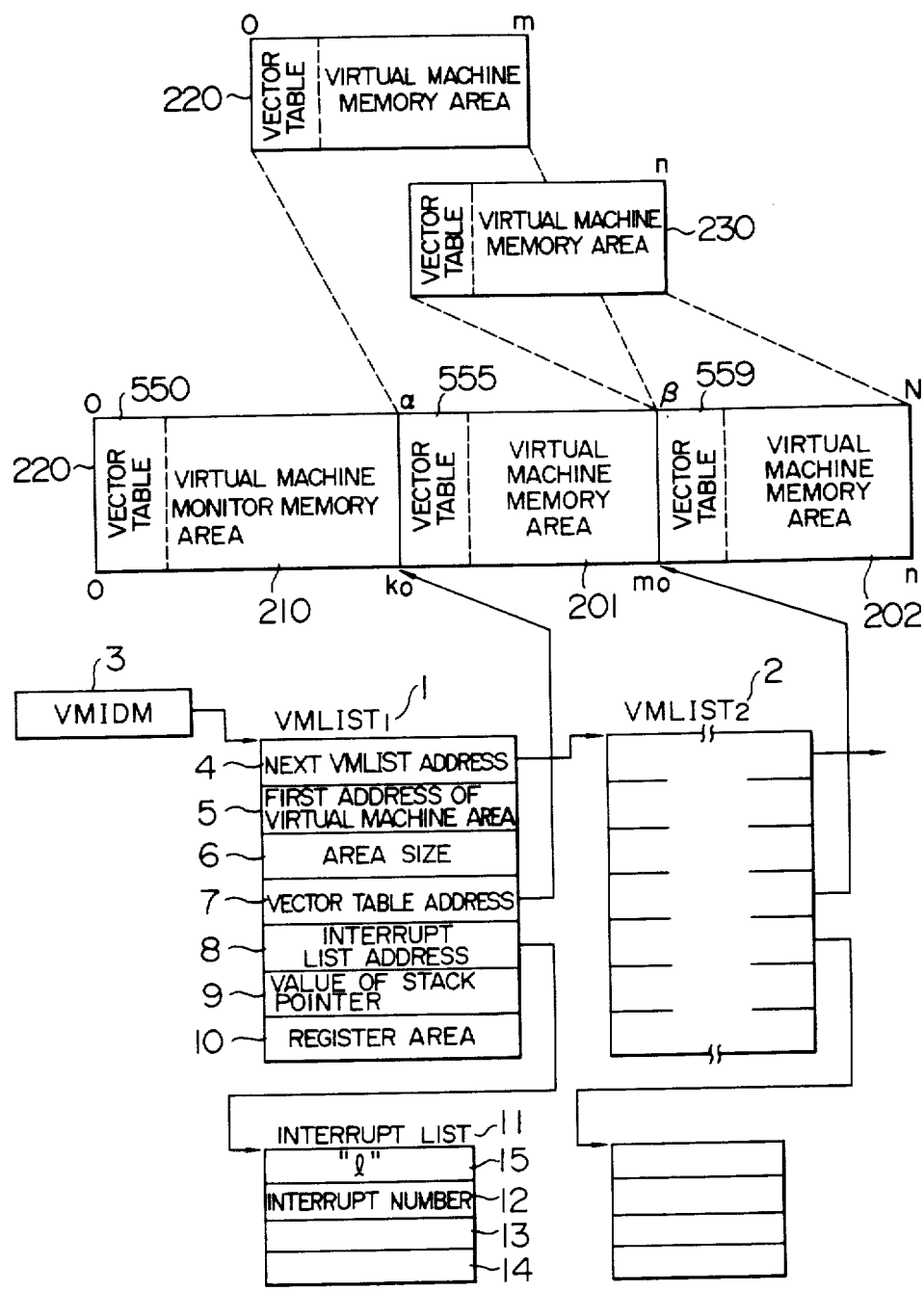
FIG. 4 is a schematic block diagram illustrating a memory and control blocks of a virtual-machine's memory and a real memory.

Referring now to FIG. 3, there is shown an example of a personal computer according to the present invention. This configuration includes a microprocessor 51, a clock generator 52, and an interrupt control circuit 53, a main memory (RAM) 54 which functions as a real memory 200 of FIG. 4. The RAM, is used to store therein the control program identified as a virtual machine monitor 502, OS 506, and user program 515, and the like shown in FIGS. 1, 2. The virtual machine monitor 502 contains the control information items such as control blocks 1, 2 and an interrupt list 11 as shown in FIG. 4. The system of FIG. 3 includes a memory control unit 55, a disk control circuit 56, a magnetic disk file (DISC) 57, a printer control circuit 58, a printer (PRT) 59, a display/keyboard (D/K) control circuit 60, a CRT unit with keyboard (KEY) 61, a communication control circuit 62, and a communication circuit unit 63. These peripheral devices can be selectively installed, or other than those included in FIG. 3 may also be used.

The CPU 51 is interconnected with each component by use of a 24-bit wide address bus 66, a 16- or 32-bit wide data bus 67, a group of control signal lines 70 to the respective units, and a group of answer signal lines 71 therefrom. Moreover, the CPU 51 is connected to the memory control unit 55 by use of a function line bus 68 transferring information to indicate an operation mode of the CPU 51, a virtual machine number, an access type, and the like and a group of signal lines 73 notifying from the memory control unit 55 to the CPU 51 an address exception, a memory error, and the like.

FIG. 4 is a block diagram illustrating relationships between a method for allocating the real memory formed in the RAM 54 of FIG. 3 and logical memory areas 220, 230 of each virtual machine, and the control information named as a control block 1-3 and 11 necessary for implementing the virtual machine system. The control information items are stored in a memory area 210 of the virtual machine monitor. Memory areas 201, 202 are continuously allocated to the virtual machines.

The areas 201 (physic a addresses $\alpha$ to $\beta-1$) and 202 (physical addresses $\beta$ to N) of the real memory 200 are allocated to an address space 220 (logical addresses 0 to m) and an address space 230 (logical addresses 0 to n), respectively, whereas the area 210 (physical addresses 0 to $\alpha$-1) of the real memory 200 is allocated to the virtual machine monitor 502.

The virtual machine monitor area 210 is provided according to the virtual machines 504, 505 with control blocks VMLIST$_1$ 1 and VMLIST$_2$ 2 keeping control information necessary for the dispatch processing. The address of a control block associated with the running virtual machine is indicated by a control block pointer VMIDM 3 also disposed in the virtual machine monitor area 210. The entries of the control blocks keep a next control block address 4, a first address of a real memory area allocated to the corresponding virtual machine 5, an extent size of the area 6, an address of the vector table of the virtual machine 7, an address 8 of the interrupt list 11 to be described later, a value 9 of the stack pointer for the virtual machine, and virtual-machine's various registers 10. The interrupt list 11 indicated by the entry 8 is also stored in the virtual machine monitor area 210 to keep interrupt numbers 12-14 for which the virtual machine is allowed to directly execute the processing without the intervention of the virtual machine monitor, and to keep the number of entries (the interrupt numbers kept therein) 15.

When initiating an operation of a virtual machine, the virtual machine monitor 502 executes the dispatch processing to allocate the real hardware such as the CPU 51 and registers to the virtual machine. In this operation, registers 10 kept in the control block, VMLIST is moved to the group of registers in the CPU 51. During the dispatch processing, the content of the vector table 550 (to be referred to as a system vector table hereinbelow) in the virtual machine monitor 502 and the content of the system stack pointer are replaced as described above. The processing procedure will be described in detail by reference to FIG. 7 later in this specification.

Figure 5:
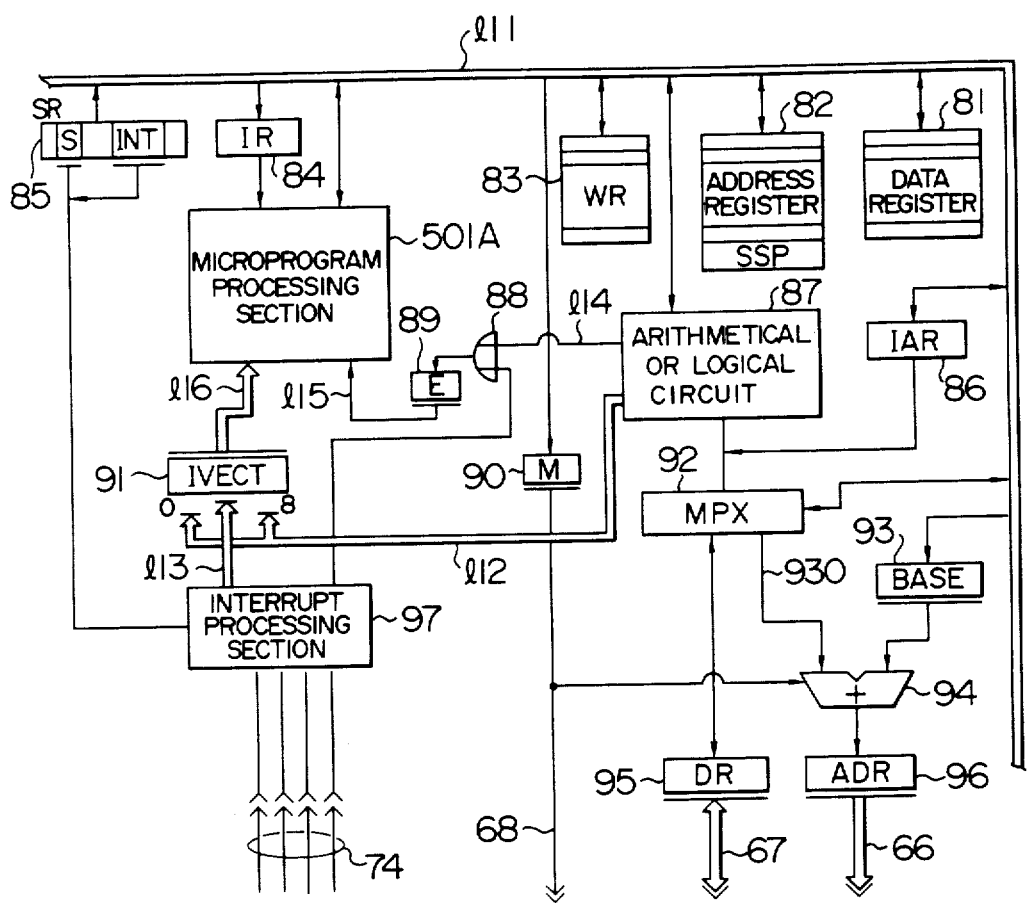
FIG. 5 is a structural diagram depicting the configuration of the microprocessor (CPU) of FIG. 3.

FIG. 5 is a block diagram schematically showing the microprocessor (CPU) 51 of FIG. 3. This configuration includes a group of data registers 81, a group of address registers 82, a group of work registers (WR's) 83, an instruction register (IR) 84, a status register (SR) 85, and an instruction address register (IAR) 86 each connected to an internal data bus 111.

There are further included an arithmetical or logical operation circuit 87 executing addition, subtraction, and shift operations, an OR circuit 88, a flag 89 indicating an occurrence of an exceptional condition, and a flag 90 used when the logical memory areas 220, 230 of each virtual machine is associated with the areas of the real memory 200 as shown in FIG. 4 so as to indicate whether or not the value of the first address in the real memory (namely, the value indicated by the reference numeral 5 in FIG. 4) is added to the value of the logical area of each virtual machine. If the flag 90 is set to '1' (on), the first address value of the real memory is added to the value of the logical area of the virtual machine.

FIG. 5 further comprises a register, IVECT 91 for keeping a cause of an interrupt condition, or an exceptional condition occurrence, a multiplexer (MTX) 92, a register (BASE) 93 for keeping a first address value of the real memory corresponding to the logical area of each virtual machine, an adder 94, a data register (DR) 95 for keeping data, and an address register (ADR) 96 for keeping an address.

Reference numeral 97 indicates an interrupt processing section for determining whether or not an interrupt reason notified from the interrupt control circuit 53 of FIG. 3 interrupting the microprogram processing section 501A by use of the status register, SR 85, and controlling an operation to send the interrupt number to the IVECT 91 when an interrupt is detected.

Among the signal lines of FIG. 5, those indicated by → and ← mean signal lines to and from a device located externally with respect to the CPU chip.

Reference numeral 501A indicates a microprogram processing section comprising a group of microprograms in which a sequence of instructions stored in the real memory of the microprogram is sequentially fetched and temporarily held in the instruction register 84, and then the instruction is interpreted. This section 501A further controls driving the arithmetical or logical operation circuit 87 according to an indication of the instruction and executes a processing associated with an interrupt when an interrupt condition occurs as shown in FIG. 2.

The operation to be effected when an interrupt condition, namely, an exceptional condition occurs will be described in detail by referring to FIG. 6.

The microprogram processing section 501A instructs to fetch a sequence of instructions from the RAM 54 of FIG. 3 based on the memory address value kept in the instruction address register 86. When the instruction address register 86 contains a logical address value of a virtual machine, namely, the value of addresses 0-m of the memory 220 shown in FIG. 4 (the M flag 90 is on), the value of the BASE 93 is added to the memory address value 900 in the adder 94, and thereafter a read request is issued to the RAM 54.

The sequence of instructions read from the RAM 504 and kept in the data register 95 are transferred via the data bus (11 so as to be stored in the instruction register 84. Next, based on the instruction data kept in the instruction register 84, an operation such as addition, subtraction, or division is executed between the values of the group of data registers 81 and those of the RAM 54. If a zero division exception occurs as a result of the operation, a signal notifying this condition is transmitted through a signal line 114 and the OR circuit 88 to set the condition occurrence flag (E) 89 to on. A number indicating the zero division exception is sent through a signal line 112 so as to be kept in the register IVECT 91.

Figure 6:
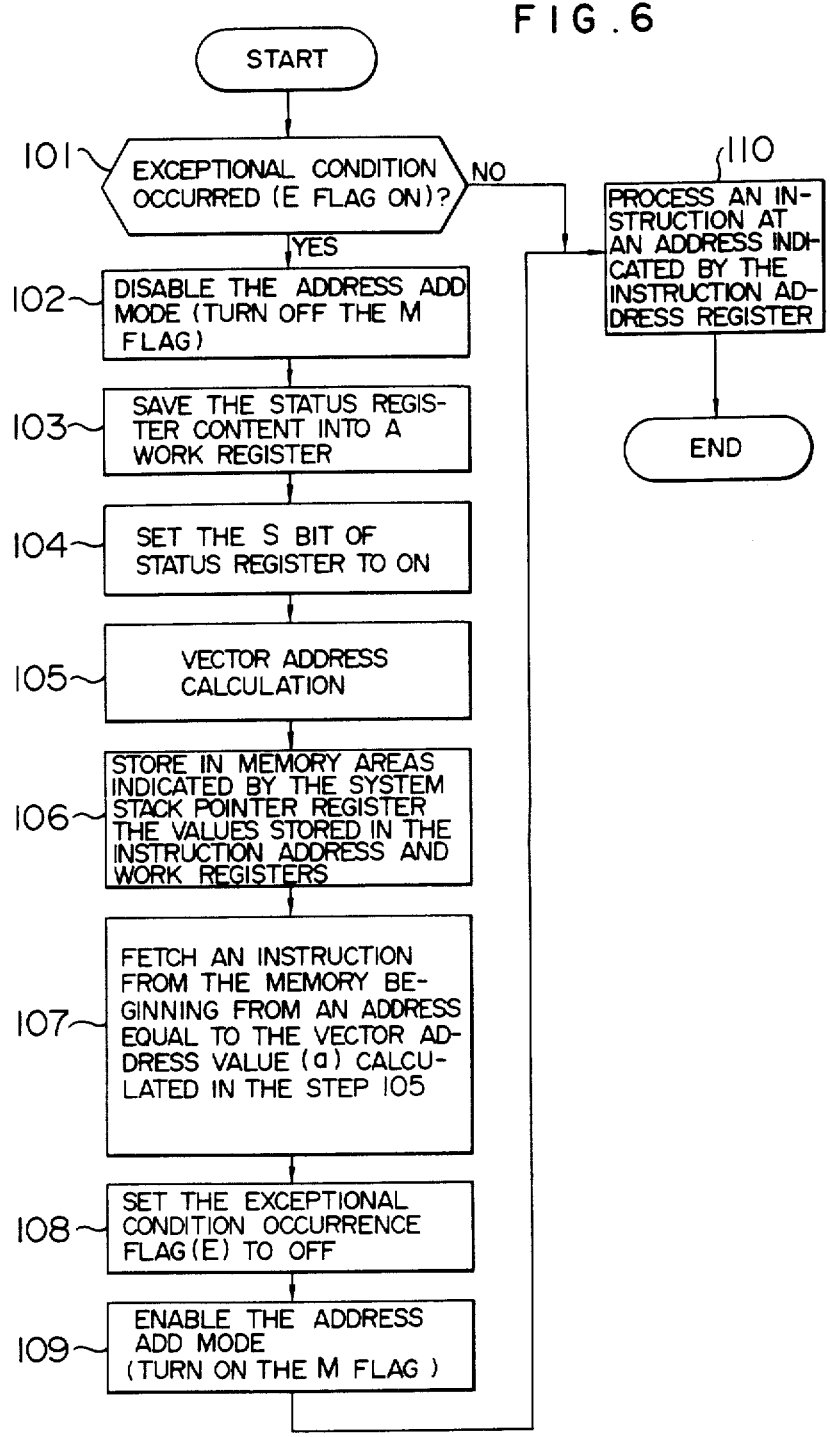
FIG. 6 is a flowchart showing operations of the microprogram processing section of FIG. 5.

FIG. 6 is a flowchart of processing to be executed in the microprogram processing section 501A of FIG. 5. First of all, a judge processing step 101 is achieved to determine whether or not an exceptional condition has occurred. As a result, if an occurrence of an exceptional condition, namely, an interrupt is detected, the processing steps 102-109 are executed. A processing step 110 performs an ordinary instruction interpretation. If the M flag is set to off in the step 102, the value of the BASE 93 is not added to the value of the logical area when the real memory of the RAM 54 of FIG. 3 is accessed.

The processing steps 103-107 indicate details of the microprogram processing to be executed in the microprogram processing section of FIG. 2. The exceptional condition occurrence flag (E) is turned off in the processing step 108, the mode in which the value of the BASE 93 is to be added to the value of the logical area is restored in the processing step 109, and then the instruction is executed in the processing step 110. Consequently, the group of instructions stored in the memory area beginning from the memory address set to the entry of the vector table 550 are executed.

Figure 7:
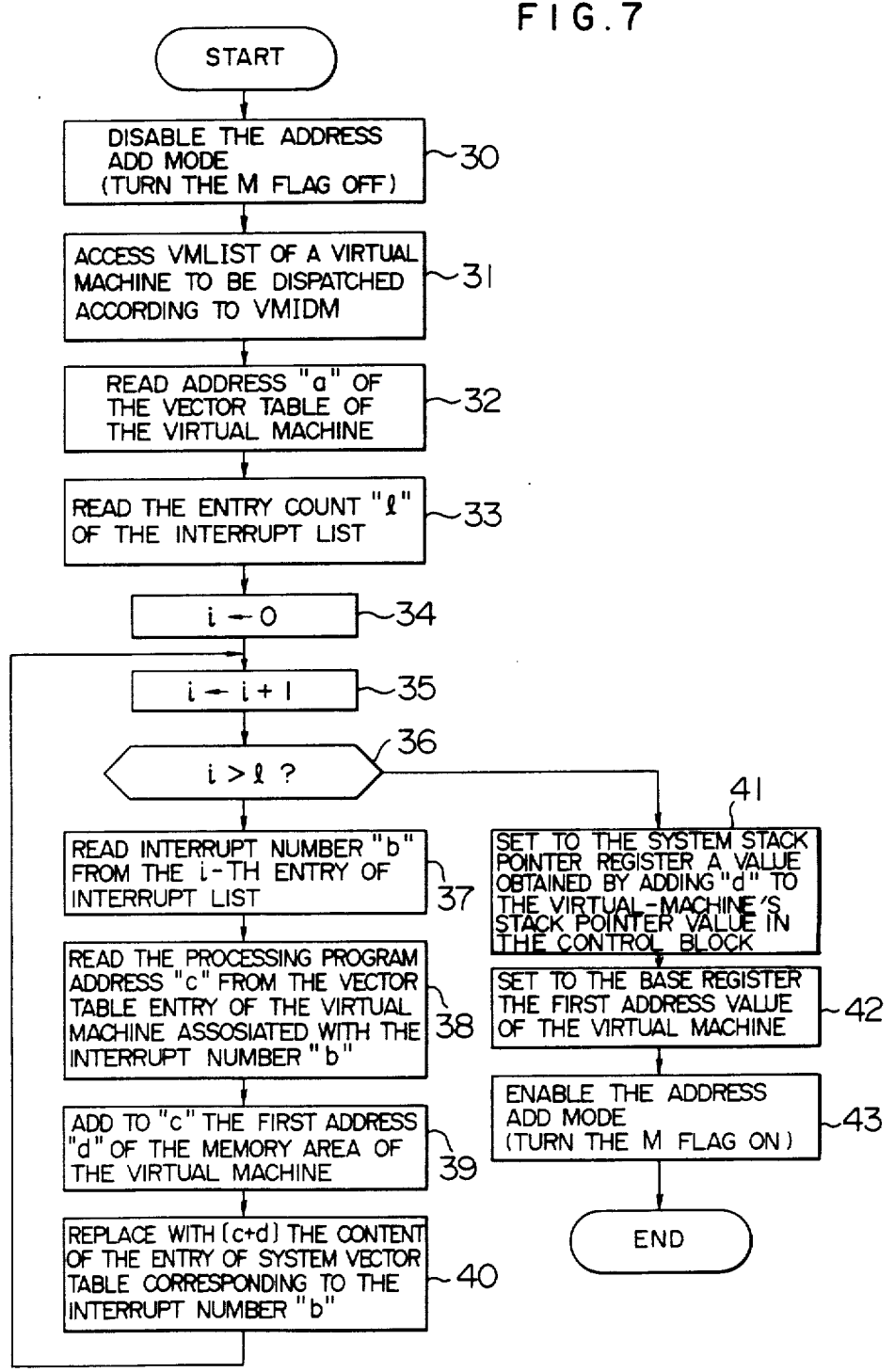
FIG. 7 is a flowchart of a processing section of the dispatch processing to be executed in the virtual machine monitor according to the present invention.

According to the present invention, when the virtual machine monitor accomplishes the dispatch processing for the virtual machine without altering the flow of the microprogram processing, the content of the vector table 550 (system vector table) in the virtual machine monitor 502 and the content of the system stack pointer are replaced by executing the procedure of the flowchart shown in FIG. 7.

In a processing step 31 of FIG. 7, a control block, for example, VMLIST$_1$ 1 indicated by the VMID 3 is accessed. The control block contains various status items of a virtual machine, for example, virtual machine 504 for which the service is to be effected.

In a processing step 32, an address 7 of a vector table, for example, vector table address 555 of the virtual machine is read from the control block VMLIST$_1$ 1. Assume the address value obtained to be represented by "a".

In a processing step 33, an address 8 of the interrupt list 11 is read from the control block VMLIST$_1$ 1, then the interrupt list 11 is accessed by use of the address 8 to obtain the number of entries "l" 15.

The count value "i" of the counter is initialized to "0" in a processing step 34, and "1" is added thereto in a processing step 35. In a processing step 36, the count value "i" is compared with the number of entries "l". If "i" is at most "l", processing steps 37-39 are executed. The processing steps 35-39 are repetitiously achieved until the count value "i" exceeds "l", that is, all entries of the interrupt list 11 are processed.

In the processing step 37, the i-th entry of the interrupt list 11 is accessed to read therefrom an interrupt number stored therein. Assume the interrupt number obtained to be represented by "b".

In the processing step 38, an address of an entry corresponding to the interrupt number "b" stored in the vector table of the virtual machine is calculated by use of the vector table address "a" obtained in the processing step 32 and the interrupt number "b" resulting from the processing step 37 as follows.

$$a + b \times [\text{entry size}]$$

where, the entry size is the number of bytes constituting an entry of the vector table and is ordinarily four. Next, the content of the objective entry is read by use of the address thus obtained. The content of this entry is the first address (logical address) of a processing program, for example, the interrupt processing program 557 of the virtual machine for the interrupt indicated by the number "b". Assume this address to be represented by "c".

In the processing step 39, the value "c" thus obtained is added to the first address 5 (assumed to be represented by "d") of the virtual machine memory area stored in the control block VMLIST$_1$ 1, thereby supplying the first physical address of the interrupt processing program of the virtual machine corresponding to the interrupt number "b".

In the next processing step 40, the content of the entry, for example, entry 533 of the system vector table 550 associated with the interrupt number "b" is replaced with the value, [c+d] resulting from the processing step 39, namely, the first physical address of the interrupt processing program of the virtual machine corresponding to the interrupt number "b".

If the count value "i" exceeds "l" in the processing step 36, the processings 37 to 40 have been completed for all entries of the interrupt list. Consequently, control proceeds to a processing step 41 where the content of the system stack pointer register is replaced with a value obtained by adding the first address "d" of the area to the value 9 of the system stack pointer of this virtual machine in the control block $VMLIST_1$ 1. The value 9 of the system stack pointer is a logical address of a stack area, for example, stack area 201 of the pertinent virtual machine, and hence the content of the system stack pointer register does not indicate the stack 558 area of the virtual machine monitor as is the case of the ordinary method but it indicates a stack area, for example, stack area 201 of the running virtual machine. Although the system stack pointer register is not shown in the drawings, it is a register disposed in a microprocessor and can be referenced and updated by a program. The first address "d" of the virtual machine memory area is added to determine the first address of the interrupt processing program of the virtual machine to be stored in the system vector table in the processing step 39 and the stack pointer value of the virtual machine to be stored in the system stack pointer register in the processing step 41. However, the operation of addition need not be necessarily accomplished during the above-mentioned processing of the dispatch processing. The control blocks 1, 2 and the interrupt list 11 are generated when the virtual machine monitor generates each virtual machine. Consequently, as an alternative procedure, when these virtual machines are created, each entry of the interrupt list 11 may be loaded with the first physical address (obtained by adding "d" to the address value kept in the vector table of the virtual machine) of the corresponding interrupt processing program of the virtual machine in addition to the interrupt number, and the physical address of the stack of the virtual machine may be stored as the value 9 of the stack pointer in the control block $VMLIST_1$ 1. With this provision, the address value in the interrupt list and the stack pointer value in the control block can be directly stored in the system vector table and the system stack pointer register, respectively.

In accordance with the present invention, the interrupt operation processing of the virtual machine monitor which is indispensable in the known system becomes unnecessary, and hence the overhead caused by the processing is eliminated thereby providing an efficient virtual machine system, which is quite effective particularly for a small-sized computer such as a personal computer.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. An interrupt control method in a virtual machine system wherein a plurality of virtual machines are realized by selectively putting into execution, under control of a first control program, one of a plurality of second control programs respectively controlling execution of programs to be executed by said virtual machines, said first control program having a corresponding first vector table for holding physical addresses required to start interrupt processing programs included either in said first control program or in one of said second control programs under execution and said second control programs each having a corresponding second vector table for holding logical addresses indicative of interrupt processing programs included in each second control program, said method comprising the steps of:
   (i) generating physical addresses indicative of addresses of interrupt processing programs included in a selected second control program put into execution under control of said first control program, said generation being done based upon said logical addresses held by said second vector table corresponding to said selected second control program;
   (ii) writing the generated physical addresses into entries within said first vector table which are predetermined as entries for holding addresses required to start said interrupt processing programs included in said selected second control program;
   (iii) starting execution of said selected second control program after the second step (ii);
   (iv) reading out one of the addresses held by said first vector table corresponding to an interrupt processing program in response to a generated interrupt request; and
   (v) starting said interrupt processing program indicated by said read out address, irrespective of whether or not said interrupt processing program is included in said first control program or said selected second control program.

2. An interrupt control method according to claim 1 wherein said first step (i) includes the step of adding an address value kept in said second vector table to a first address of a main memory area allocated to said selected second control program so as to determine the physical addresses.

3. An interrupt control method according to claim 1, wherein said first step (i) includes the step of accessing each of a plurality of entries in said second vector table corresponding to said selected second control program based on a start address of said second vector table of said selected second control program and one of a plurality of interrupt identification numbers predetermined for interrupt requests which should be processed by each of said interrupt processing programs included in said selected second control program; and wherein said second step (ii) includes the step of accessing each entry in said first vector table based on said one interrupt identification number.

4. An interrupt control method according to claim 3 wherein said fourth step (iv) includes the step of accessing an entry in said first vector table based on an interrupt number included in the generated interrupt request.

5. A virtual machine system having a plurality of virtual machines running in a bare machine under control of a control program, said control program including a plurality of instructions, said system comprising:
   (i) a memory area of a virtual machine of said plurality of virtual machines existing in a main memory of said bare machine, said memory area being subjected to processing and being continuously allocated;
   (ii) means to be operated at an execution of an instruction for adding a first address of the memory area of said virtual machine to a memory address of said bare machine which is generated at the execution of the instruction;

(iii) means to be operated at an occurrence of an interrupt for inhibiting said addition of a first address of the memory area of said virtual machine and a memory address of said bare machine which is generated at the execution of the instruction; and (iv) means for releasing the inhibiting function performed by said means to be operated at an occurrence of an interrupt before control is returned to execution of an instruction after completion of interrupt processing.

6. A virtual machine system according to claim 5 wherein said bare machine comprises a microprocessor.

* * * * *